(12) United States Patent
Neumann et al.

(10) Patent No.: US 12,662,222 B2
(45) Date of Patent: Jun. 23, 2026

(54) PRESSURE REDUCTION DEVICE, PROCESS AND COMPUTER PROGRAM FOR MANUFACTURING A PRESSURE REDUCTION DEVICE

(71) Applicant: Dräger Safety AG & Co. KGaA, Lübeck (DE)

(72) Inventors: Carl-Christoffer Neumann, Lübeck (DE); Hendrik Fischer, Lübeck (DE)

(73) Assignee: DRÄGER SAFETY AG & CO. KGAA, Lübeck (DE)

( * ) Notice: Subject to any disclaimer, the term of this patent is extended or adjusted under 35 U.S.C. 154(b) by 690 days.

(21) Appl. No.: 18/170,003

(22) Filed: Feb. 16, 2023

(65) Prior Publication Data

US 2023/0264793 A1 Aug. 24, 2023

(30) Foreign Application Priority Data

Feb. 18, 2022 (DE) ..................... 10 2022 103 859.9

(51) Int. Cl.
| | |
|---|---|
| *B63C 11/22* | (2006.01) |
| *B33Y 10/00* | (2015.01) |
| *B33Y 50/02* | (2015.01) |
| *B33Y 80/00* | (2015.01) |

(52) U.S. Cl.
CPC .......... *B63C 11/2209* (2013.01); *B33Y 10/00* (2014.12); *B33Y 50/02* (2014.12); *B33Y 80/00* (2014.12)

(58) Field of Classification Search
CPC ................. B63C 11/2209; B63C 11/32; B63C 11/2227; B63C 2011/2254; B63C 11/28; B63C 2011/2263; B33Y 10/00; B33Y 50/02; B33Y 80/00; A62B 9/003; A62B 9/00; A62B 7/06; A61M 2202/03; A61M 16/10; A61M 16/1045; A61M 16/1075
See application file for complete search history.

(56) References Cited

U.S. PATENT DOCUMENTS

| | | | | | |
|---|---|---|---|---|---|
| 3,898,978 | A | * | 8/1975 | Marcus ................... | B63C 11/28 126/204 |
| 4,195,619 | A | * | 4/1980 | Hollen ................... | B63C 11/28 126/204 |
| 4,294,225 | A | * | 10/1981 | Mayo ........................ | A61F 7/00 126/204 |

(Continued)

FOREIGN PATENT DOCUMENTS

| | | |
|---|---|---|
| CN | 2191176 Y | 3/1995 |
| CN | 103987346 A | 8/2014 |

(Continued)

OTHER PUBLICATIONS

Atemregler. In: Wikipedia, Die freie Enzyklopadie. Bearbeitungsstand: Apr. 15, 2019, 13:20.

(Continued)

*Primary Examiner* — Bradley H Philips
*Assistant Examiner* — Tyler A Raubenstraw
(74) *Attorney, Agent, or Firm* — McGlew and Tuttle, P.C.

(57) ABSTRACT

A device (100) for pressure reduction is configured with an improved flow guidance. The improved flow guidance causes an advantageous reduction of flow noise and a reduction of icing problems.

19 Claims, 5 Drawing Sheets

(56)  References Cited

U.S. PATENT DOCUMENTS

| | | | | |
|---|---|---|---|---|
| 4,314,566 A * | 2/1982 | Kiwak | .................... | B63C 11/24 |
| | | | | 62/51.1 |
| 4,430,988 A * | 2/1984 | Krasberg | ............. | A62B 17/005 |
| | | | | 126/263.02 |
| 5,685,297 A | 11/1997 | Schuler | | |
| 8,166,974 B2 * | 5/2012 | Pedemonte | ......... | B63C 11/2227 |
| | | | | 128/205.24 |
| 11,604,018 B1 * | 3/2023 | Murray | ................... | F25B 9/004 |
| 2002/0179089 A1 | 12/2002 | Morgan et al. | | |
| 2005/0217275 A1 * | 10/2005 | Hendrickson | ............. | F02C 1/02 |
| | | | | 128/200.24 |
| 2006/0054167 A1 * | 3/2006 | Garofalo | ................. | B63C 11/02 |
| | | | | 128/201.27 |
| 2007/0144592 A1 * | 6/2007 | Taylor | ..................... | F16K 15/18 |
| | | | | 137/540 |
| 2008/0066739 A1 * | 3/2008 | LeMahieu | ............ | A61M 11/041 |
| | | | | 128/200.14 |
| 2008/0099018 A1 * | 5/2008 | Clarke | ................... | A62B 9/022 |
| | | | | 128/204.26 |
| 2008/0135102 A1 * | 6/2008 | Aluigi | ................. | B63C 11/2209 |
| | | | | 137/81.2 |
| 2010/0242966 A1 * | 9/2010 | Johnson | ................... | B63C 11/24 |
| | | | | 128/205.12 |
| 2012/0125311 A1 * | 5/2012 | Grammens | ............. | F23N 3/082 |
| | | | | 126/116 R |
| 2015/0007813 A1 * | 1/2015 | Sanders | .................. | B63C 11/22 |
| | | | | 128/201.25 |
| 2015/0047637 A1 * | 2/2015 | Peters | ...................... | A62B 7/12 |
| | | | | 128/203.26 |
| 2015/0259057 A1 * | 9/2015 | Solari | ................. | B63C 11/2209 |
| | | | | 137/1 |
| 2017/0225757 A1 | 8/2017 | Gill et al. | | |
| 2017/0253311 A1 * | 9/2017 | Showers | .............. | B63C 11/186 |
| 2018/0186437 A1 * | 7/2018 | Toth | .................... | B63C 11/2209 |
| 2019/0175412 A1 * | 6/2019 | Benton | ...................... | F24F 1/04 |
| 2020/0030643 A1 * | 1/2020 | Griffiths | ................... | A62B 9/02 |
| 2021/0245852 A1 * | 8/2021 | Angelini | ............ | G05D 16/0663 |

FOREIGN PATENT DOCUMENTS

| | | |
|---|---|---|
| CN | 113390006 A | 9/2021 |
| EP | 0512887 A1 | 11/1992 |
| WO | 02064201 A1 | 8/2002 |
| WO | 2015091399 A1 | 6/2015 |

OTHER PUBLICATIONS

Atemregler, Abbildung Membrangesteuerte erste Stufe im Schnitt. In Wikipedia, Die freie Enzyklopadie. Bearbeitungsstand: Apr. 15, 2019, 13:20.

Mechanism of Diving Regulators. Wikipedia. https://en.wikipedia.org/wiki/Mechanism_of_diving_regulators.

* cited by examiner 301, 300

308

300

308

300

302, 300

300

PRESSURE REDUCTION DEVICE, PROCESS AND COMPUTER PROGRAM FOR MANUFACTURING A PRESSURE REDUCTION DEVICE

CROSS REFERENCE TO RELATED APPLICATIONS

This application claims the benefit of priority under 35 U.S.C. § 119 of German Application 10 2022 103 859.9, filed Feb. 18, 2022, the entire contents of which are incorporated herein by reference.

TECHNICAL FIELD

The present invention relates to configurations of a pressure reduction device.

The present invention also relates to a process and a computer program for controlling a production facility for manufacturing a pressure reduction device.

BACKGROUND

Devices for pressure reduction are often also called pressure reducers and are used as breathing regulators (regulators) in diving technology or as components of personal protective equipment, for example as breathing regulators for compressed air breathing apparatus. For a reduction of pressure, for example from a high-pressure level above 200 bar to a medium-pressure level of 5 bar, special situations arise due to the reduction of pressure in diving applications or during dives during the inhalation process, even at temperatures of the surrounding water above 10° C., that the cooling of the breathing gas associated with the pressure reduction can cause icing on components or elements. In some cases, this results in external icing, which affects the freezing of the pressure reduction devices or the pressure reducer in areas that are surrounded by water during the dive. In some cases, this also results in icing that also affects freezing of components in devices for pressure reduction or in pressure reducers in areas that are surrounded by water during the dive. Icing can occur on components or connections of components—particularly components in contact with water—in which a reduction from an inlet pressure to an outlet pressure occurs. Icing can also occur more frequently at components or connections of components where the high and locally also excessive flow velocity—mostly in conjunction with turbulence—occurs in the vicinity of walls of the flow-carrying components such as pipelines, connecting elements, for example nozzles, component transitions, component connections, for example fits or threads or the like. Increased flow velocities at walls or stages result in local pressure drops and situations with turbulence and, in addition to the aforementioned icing problem, are often causes—especially with regard to the pressure drops—for unfavorable constellations for the provision and inflow of sufficient quantities of breathing gas to a user.

In order to provide and deliver sufficient quantities of gas to a user, the pressure drops resulting from turbulence in a breathing regulator must be compensated for by design, which often then has to be achieved by increasing the flow cross-sections of connecting lines and valve elements.

All in all, this means that the regulator is often large and heavy in terms of dimensions, which can be seen as disadvantageous in terms of handling and the user's comfort requirements.

In addition, situations with turbulence are also often causes of noise problems with increased noise development during operation of the regulator, since turbulence generates noise which can then be transmitted into the user's breathing mask. In an application for firefighters, noise from the breathing regulator with transmission into the breathing mask can have disadvantages, especially and for example when using communication technology (radiotelephony).

In addition, noise radiation to the surroundings may result, which may also be considered or perceived as disturbing.

Connecting components or elements for connecting the device are, for example, connection elements which are configured and provided for connecting the hose lines to the supply containers. In the supply containers, the breathing gases (air, oxygen) or breathing gas mixtures for the use of the diving apparatus or compressed air breathing apparatus are usually kept ready at a high pressure, i.e. above 150 bar (usual range: 200 bar-400 bar).

Connecting components or elements for connecting the device may also be mentioned here, for example, connection elements which are configured and provided for connecting the hose lines to the breathing mask

SUMMARY

With regard to the flow guidance and supply of respiratory gases, in particular also with regard to the mentioned problem of pressure drops at components of a regulator during the supply of respiratory gases to a user as well as the icing problem and/or also the noise problem, there is therefore a need, based on the state of the art, to improve the functionality of devices for pressure reduction, in particular regulators.

Features and details described in the context of the present inventions in connection with devices and embodiments of devices apply, of course, also in connection with the processes described in the context of the present invention as well as computer programs on a non-transitory computer-readable medium for carrying out the process and their embodiments, as well as vice versa in each case, so that with regard to the disclosure concerning the individual aspects of the invention, reference is or can always be made mutually.

It is an object of the present invention to provide a pressure reduction device with improved flow control.

A further object of the present invention is to provide a process of controlling a production facility for automated manufacture of a pressure reduction device having improved flow control.

Another object of the present invention is to provide a computer program or computer program product that implements automation of manufacturing steps on a production facility.

The tasks are solved by a pressure reduction device having features according to the invention.

The task is solved by a process for a control of a production device for an automated production of the device for pressure reduction having features according to the invention.

The task is solved by a process for a control of a production device for an automated production of the device for pressure reduction having features according to the invention.

The task is solved by a computer program on a non-transitory computer-readable medium or computer program product (comprised by non-transitory computer-readable medium) and comprising a program code for carrying out at least one of the processes with features according to the invention.

Advantageous embodiments of the invention are explained in more detail in the following description with partial reference to the figures.

Embodiments of a device for pressure reduction—in particular in embodiments of a breathing regulator—with improved flow guidance are shown.

A first inventive aspect is formed by a device for reducing pressure with improved flow guidance.

A device for pressure reduction with improved flow guidance has an arrangement with an inner chamber, an outer chamber, a first gas supply line having a gas inlet for fluidic connection to a high pressure gas source for supplying quantities of gas from the high pressure source to the interior chamber of the arrangement, a second gas supply line for supplying and delivering quantities of gas to a gas outlet.

The arrangement can also be called a breathing regulator or regulator.

The inner chamber can also be referred to as a high pressure chamber.

The outer chamber can also be referred to as a medium pressure chamber.

The arrangement with the inner and outer chamber enables a reduction of gas quantities. The arrangement is thus configured with a functionality of a pressure reducer, which is configured to reduce the pressure level from a first pressure level to a second pressure level. The arrangement can thus also be referred to as a pressure reducer.

The gas inlet serves to connect a connecting line to the arrangement, for example in the form of a hose connection suitable for high pressures. The gas quantities at the first pressure level are usually provided by means of a high-pressure source, often in the form of a cylinder containing a gas mixture compressed under high pressure. The hose connection may be or become fluidically connected to the high pressure source.

For reducing the pressure, the arrangement has a valve assembly with a valve seat, a valve element with a flexibly configured diaphragm and a spring element. In addition, an adjustment element can be provided for adjusting the pre-load of the spring element.

Connecting elements are provided in the valve assembly, which are configured to connect the diaphragm to both the spring element and the valve element.

The diaphragm is held on the outer chamber, for example on walls of the outer chamber, by means of a diaphragm attachment. The diaphragm attachment allows the diaphragm to move and deflect if, for example, a force is applied to the diaphragm by gas quantities of the first or second pressure level, by the spring element or by pressure acting from outside, for example water pressure.

The pressure is reduced from a first pressure level (high pressure, high pressure stage) above 10 MPa or 100 bar to a second pressure level (medium pressure, medium pressure stage) in a pressure range below 10 MPa or 100 bar and above 0.2 MPa or 2.0 bar. The first pressure level represents a high-pressure range, such as is used for provision by means of high-pressure gas cylinders. The high pressure range is typically above 20 MPa or 200 bar. The second pressure level represents a medium pressure range. A typical medium pressure for a supply and provision for users such as firefighters, mountain rescue services, mine rescue services is, for example, a medium pressure of 0.5 MPa or 5.0 bar to 1 MPa or 10.0 bar. The first pressure level is also referred to as high pressure. The second pressure level is also referred to as medium pressure.

The first gas supply line is used within the device to supply and guide the quantities of gas at the first pressure level (high pressure) from the gas inlet to the valve arrangement.

The second gas supply line is used within the device to supply quantities at a level of a second pressure level (medium pressure) from the arrangement of quantities of breathing gases from the valve arrangement to the gas outlet.

The gas outlet is used to connect a connecting line, for example in the form of a suitable hose connection, to a fluidic connection with a regulator.

The regulator (a demand valve) represents a second pressure reduction arrangement, as it were, which is configured to reduce the pressure from the second pressure level (medium pressure) to a third pressure level (low pressure). The third pressure level represents a low pressure range with a pressure level below 0.2 MPa or 2.0 bar, at which the user can breathe in and out during use. Such a demand valve for supplying quantities of breathing gas to a user is often also referred to as a lung demand valve (LDV). The demand valve then provides quantities at the third pressure level as breathing gas directly to a user in the form of a mouthpiece or connector for a breathing mask. The third pressure level is also referred to as low pressure.

Users include, for example, firefighters and firefighting and rescue personnel as well as divers from the fire department, technical relief organization and police.

The arrangement forms a first pressure reduction from high pressure to medium pressure as part of the pressure reduction device. The second arrangement (regulator) forms a pressure reduction from medium pressure to low pressure as a breathable pressure level for a user.

According to the invention, the second gas supply line is configured in such a way that the second gas supply line at least partially surrounds the outside of at least one gas-carrying section of the arrangement. This results in a thermally conductive contact between the first gas supply line and the arrangement. This advantageously results in a temperature equalization between quantities within the gas-carrying sections of the arrangement and quantities within the gas supply line and/or a temperature equalization between the gas-carrying sections of the arrangement and the second gas supply line. Gas-carrying sections of the arrangement can be the inner chamber, the outer chamber, the gas inlet, the gas outlet, walls of inner and outer chamber, gas inlet, gas outlet as well as the valve arrangement as a whole, but in particular the valve seat, the valve element, the connecting elements or the diaphragm attachment, and the diaphragm.

By means of this temperature compensation, the advantage can be achieved that icing of the device, in particular icing of the arrangement, can be reduced or even largely prevented by the cooling of the breathing gas associated with the pressure reduction.

In a preferred embodiment, the second gas supply line, starting with a first end, is arranged in a spiral shape, ring shape (annular shape) and/or helical shape at least partially on the outside around the gas-carrying sections of the arrangement. The second gas supply line opens with a second end into the gas outlet. The ring-shaped and/or helical arrangement of the second gas supply line results in the constructive situation that the second gas supply line wraps around the arrangement with several turns, as it were.

By means of this ring-shaped and/or helical wrap, the surface for forming the thermal contact between the arrangement and the second gas supply line can be optimally and maximally configured in a limited installation space, so that efficient temperature equalization between the arrangement and the second gas supply line can reduce icing of the arrangement.

In a preferred embodiment, the second gas supply line can be configured to at least partially surround other elements of the arrangement on the outside, for example also the valve arrangement, in particular also the spring element, the diaphragm fastening or the connecting elements. By means of this annular and/or helical wrap, the thermal contact between the elements of the arrangement and the second gas supply line can be optimally and maximally formed in an advantageous manner. This results in an efficient temperature equalization between the elements of the arrangement, in particular also the valve arrangement and the second gas supply line, which can largely help to prevent elements of the arrangement, in particular the valve arrangement, from icing up.

Some embodiments are based on that individual components or functional assemblies of components of the device for pressure reduction being manufactured in a manufacturing or joining process, which is based on a printing technology or 3D printing technology to form a form-fitting and/or force-fitting as well as gas-tight connection of plastic materials and/or metallic materials. Further materials are plastic composite materials or metal composite materials.

Printing technologies or 3D printing technologies enable the production of parts and/or components in a so-called additive manufacturing process (AM: Additive Manufacturing), i.e. parts and components grow additively layer by layer or layer by layer. Various printing technologies, in particular 3D printing technologies, enable the configuration of shapes that are not possible with machining or milling manufacturing processes or even with conventional injection molding processes.

The particular advantage of the embodiments described, in which printing technologies or 3D printing technologies are used, results from the fact that the components and/or functional assemblies can be configured with a novel and/or also with improved functionality thanks to the new possibilities for shaping.

As examples of other additive manufacturing processes, some additive manufacturing processes are listed below and described in brief.

FDM 3D printing (fused deposition modeling) or fused filament fabrication (FFF), often also referred to as fused layering, refers to a manufacturing process by which a workpiece is built up layer by layer from a fusible plastic or molten metal.

Binder jetting or binder jetting 3D refers to an additive manufacturing process in which powdered starting material is bonded with a binder at selected points to produce workpieces. Subsequent removal of the binder by means of a subsequent sintering process can improve the mechanical properties of the workpieces.

SLS (Selective Laser Sintering), the process of a selective laser sintering (SLS) is an industrial 3D printing process ideal for manufacturing end-use parts. In SLS, a laser selectively sinters polymer powder particles, fusing them and building a part layer by layer.

Stereolithography A workpiece is built up layer by layer from a light-curing plastic (photopolymers, for example acrylic, epoxy or vinyl ester resins) using stereolithography by means of (raster) dots materializing freely in space and cured layer by layer by a laser. In stereolithography processes, large components, since the resin cured by the laser is still relatively soft, and also certain mold elements (e.g. overhangs) must be securely fixed during the building process. For this purpose, support structures are also built during the manufacturing process. After the build process, the components are freed from the support structures, washed with solvents and fully cured in a cabinet under UV light. In microstereolithography for smaller components, no support structures are required, and in many cases post-curing can also be omitted.

MJM (MultiJet Modeling) In MJM processes, parts are produced by spraying a binder onto thin layers of polymer powder particles followed by a sintering process using an IR heat source. MJM produces functional plastic parts with isotropic, mechanical properties that can be used for prototyping or low-volume production end-use applications.

Other additive manufacturing processes are listed, for example, in the German standard "Additive Manufacturing Processes": VDI 34005, as well as in the US standard "Additive Manufacturing Technologies": ASTM F42 or in the international standard "Additive Manufacturing": ISO/TC 261. Here is an exemplary excerpt without any assertion as to completeness:

Stereolithography (SL, SLA)
Laser sintering (LS)
Laser beam melting (SLM=Selective Laser Melting, also: Laser Beam Melting=LBM)
Electron Beam Melting (EBM)
Fused Layer Modeling/Manufacturing (FLM)
Fused Filament Fabrication (FFF)
Multi-Jet Modeling (MJM)
Poly-Jet Modeling (PJM)
Binder Jetting
3D printing
Layer Laminated Manufacturing (LLM)
Digital Light Processing (DLP)
Thermal Transfer Sintering (TTS)

In a further preferred embodiment, the gas outlet has a geometry on the inside which forms an inner contour so that there is no step or shoulder in the transition between the gas outlet and a connecting element. Connecting elements for connection to the gas outlet can be configured, for example, as connecting elements, connecting lines or in the form of a hose connection. The inner contour can be produced in a manufacturing or joining process based on a printing technology or 3D printing technology, or can be produced based on the printing technology or 3D printing technology. A flow condition without a flow separation and/or fluid/aerodynamic stall and/or essentially without local turbulence and/or with an essentially laminar local flow at the transition of the gas outlet to the connecting element reduces turbulence and pressure drops at transition points between connecting elements and gas outlet and thus, for example, also reducing possible noise caused by flows.

In a preferred embodiment, the gas outlet of the arrangement is configured on the outside with a cylindrical or tubular outer contour. The cylindrical or tubular outer contour is configured to attach or receive a connecting element or a connection element. A connecting element or connection element can be configured, for example, as an element which can be connected to the cylindrical or tubular outer contour of the gas outlet by means of a joining connection, a clamping connection or a cutting connection. One example of this is the so-called cutting ring screw connections. Cutting ring fittings or cutting ring tube fittings are assembly elements for high pressures up to gas pressures above 600 bar, which are configured and intended to realize gas-tight connections between cylindrical pipeline elements. Cutting ring fittings are listed, for example, in the International Standard "Metallic tube fittings for fluid power and general use": ISO 8434-1 and are classified for applications in different pressure ranges. The outer contour can be produced in a manufacturing or joining process based on printing technology or 3D printing technology, or can be produced based on printing technology or 3D printing technology.

In a preferred embodiment, the second gas supply line is configured together with the arrangement as a common component (an integral single piece component). The common component can preferably and for example be manufactured in one piece in a manufacturing or joining process based on a printing technology or 3D printing technology or can be manufactured based on the printing technology or 3D printing technology.

In a preferred embodiment, the second gas supply line is configured together with the gas outlet as a common component. The common component can preferably and for example be manufactured in one piece in a manufacturing or joining process based on a printing technology or 3D printing technology or can be manufactured based on the printing technology or 3D printing technology.

In a preferred embodiment, the gas outlet together with the second gas supply line and the arrangement is configured as a common component. The common component can preferably and for example be manufactured in one piece in a manufacturing or joining process based on a printing technology or 3D printing technology or can be manufactured based on the printing technology or 3D printing technology.

In a preferred embodiment, the gas inlet together with the arrangement is configured as a common component. The common component can preferably and for example be manufactured in one piece in a manufacturing or joining process based on a printing technology or 3D printing technology or can be manufactured based on the printing technology or 3D printing technology.

In a preferred embodiment, the gas inlet, the gas outlet, the second gas supply line together with the arrangement is configured as a common component.

In a preferred embodiment, the common component may be manufactured in a manufacturing or joining process based on a printing technology or 3D printing technology, or is manufacturable based on the printing technology or 3D printing technology.

In a preferred embodiment, the valve assembly comprising the diaphragm, the valve seat and the valve element can be manufactured as an assembly in a manufacturing or joining process based on a printing technology or 3D printing technology, or can be manufactured based on the printing technology or 3D printing technology. The manufacturing can preferably result in a common assembly with the manufacturing or joining process, and further preferably result in a one-piece common assembly.

In a preferred embodiment, materials made of plastic materials, plastic composites, metal materials or metal composites are used in the manufacturing or joining process based on a printing technology or 3D printing technology.

The common component in a preferred embodiment can preferably and for example be manufactured in one piece in a manufacturing or joining process based on a printing technology or 3D printing technology or can be manufactured based on the printing technology or 3D printing technology. The manufacturing or joining process can preferably be carried out as an automated process.

In a preferred embodiment, no support structures are used in the manufacturing or joining process based on 3D printing technology during additive manufacturing. This offers the advantage that a post-processing step can be omitted. Support structures can be omitted, for example, if instead of a substantially circular inner shape, for example of the gas inlet, gas outlet and the second gas supply line, an inner contour with a teardrop-shaped or triangular structure is selected.

In a preferred embodiment, the gas inlet is inserted, screwed or pressed as an insert into a suitable seat arranged in the arrangement. The seat can, for example, be introduced into the arrangement by means of milling and/or machining in the form of a bore, a thread or a receptacle. The arrangement can thereby be made from a plastic material, plastic composite material in a manufacturing or joining process based on a printing technology or 3D printing technology or can be manufactured based on the printing technology or 3D printing technology.

In a preferred embodiment, the gas outlet is inserted, screwed or pressed as an insert into a suitable seat arranged in the arrangement. The seat can, for example, be introduced into the arrangement by means of milling and/or machining in the form of a bore, a thread or a receptacle.

Above, the aspect of the invention has been explained in relation to a pressure reduction device with improved flow control.

Hereinafter, a further aspect of the invention will be explained in more detail with respect to processes for controlling a production facility for automated manufacture of the device for pressure reduction with improved flow control. In addition, an aspect relating to a computer program or computer program product (computer program/computer program product on a non-transitory computer-readable medium) will be explained. The computer program or computer program product enables implementation of the process in an automation of manufacturing steps at a production facility.

Suitable production devices for the automated production of a device for pressure reduction are, in particular, printing devices, 3D printing devices as well as drilling, turning or milling devices for machining or finishing the device according to the invention prepared by means of the printing devices, 3D printing devices. The printing apparatuses and 3D printing apparatuses enable the production of parts according to the processes already mentioned in the context of this application, such as FDM 3D printing (fused deposition modeling) or fused filament fabrication (FFF), Selective Laser Sintering (SLS), MultiJet Modeling (MJM), PolyJet Modeling (PJM), Fused Layer Modeling/Manufacturing (FLM), Selective Laser Melting (SLM), Stereolithography (SL), Laser-Sintering (LS), Electron Beam Melting (EBM). Plastic materials, plastic composites, metal materials or metal composites can be used. The drilling, turning or milling equipment, especially in the form of machine tools with CNC control, (CNC=Computerized Numerical Control) enables automated processing with shaping, surface treatment, drilling, milling, threading of components. The definition of component machining or reworking can be automated by means of a CAM system (Computer-aided manufacturing=CAM). Plastic materials, plastic composites, metal materials or metal composites can be used.

Control can include closed-loop control, open-loop control, or setting and adjustment of the printing and 3D printing equipment used, such as drilling, turning, or milling equipment.

In a preferred embodiment, the process enables automated additive manufacturing in a manufacturing or joining process based on a printing technology or 3D printing technology, to arrange a second gas supply line on an arrangement having an inner chamber and an outer chamber in such a way and to form a common component from the second gas supply line with the arrangement, in that the second gas supply line is arranged in an annular and/or helical shape at least partially on the outside around the gas-carrying sections of the arrangement, and at least partial thermally conductive contact is provided between gas-carrying sections of the arrangement and the second gas supply line.

In a preferred embodiment, the process enables automated additive manufacturing in a manufacturing or joining process based on a printing technology or 3D printing technology, to arrange a gas outlet with an inner contour on an arrangement comprising an inner chamber and an outer chamber and to form a common component of the gas outlet with the arrangement in such a way that there is no step or shoulder in the transition between the gas outlet and a connecting element.

In another embodiment, a computer program or computer program product is formed with program code for performing at least one of the previously described processes to automated additive manufacturing of a device for pressure reduction when the program code is executable on a computer, a processor, or a programmable hardware component. The computer program or computer program product is formed with a program code for carrying out the process for controlling a production device, wherein the program code is executable on a computer, a processor or a programmable hardware component. In this context, the program code—in addition to instructions for controlling the 3D printing apparatus and/or drilling, turning or milling devices—also has data on the shape and configuration of the device for pressure reduction with an arrangement having an inner and outer chamber, gas outlet, gas inlet and the second gas supply line. These data may include CAD models, 3D models, 2D models, wireframe models or vector data from computer-aided engineering (CAE) programs suitable for configuration and construction.

This data can include CAD models, 3D models, 2D models, wireframe models or vector data for computer-aided manufacturing (CAM).

The computer program product and the program code include the data necessary for the creation of the pressure reduction device (CAE, CAM) in order to manufacture it by means of automated additive manufacturing on printing equipment and 3D printing equipment as well as drilling, turning or milling equipment.

By means of the following description, with partial reference to the figures, the aspects of the invention are explained in more detail. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
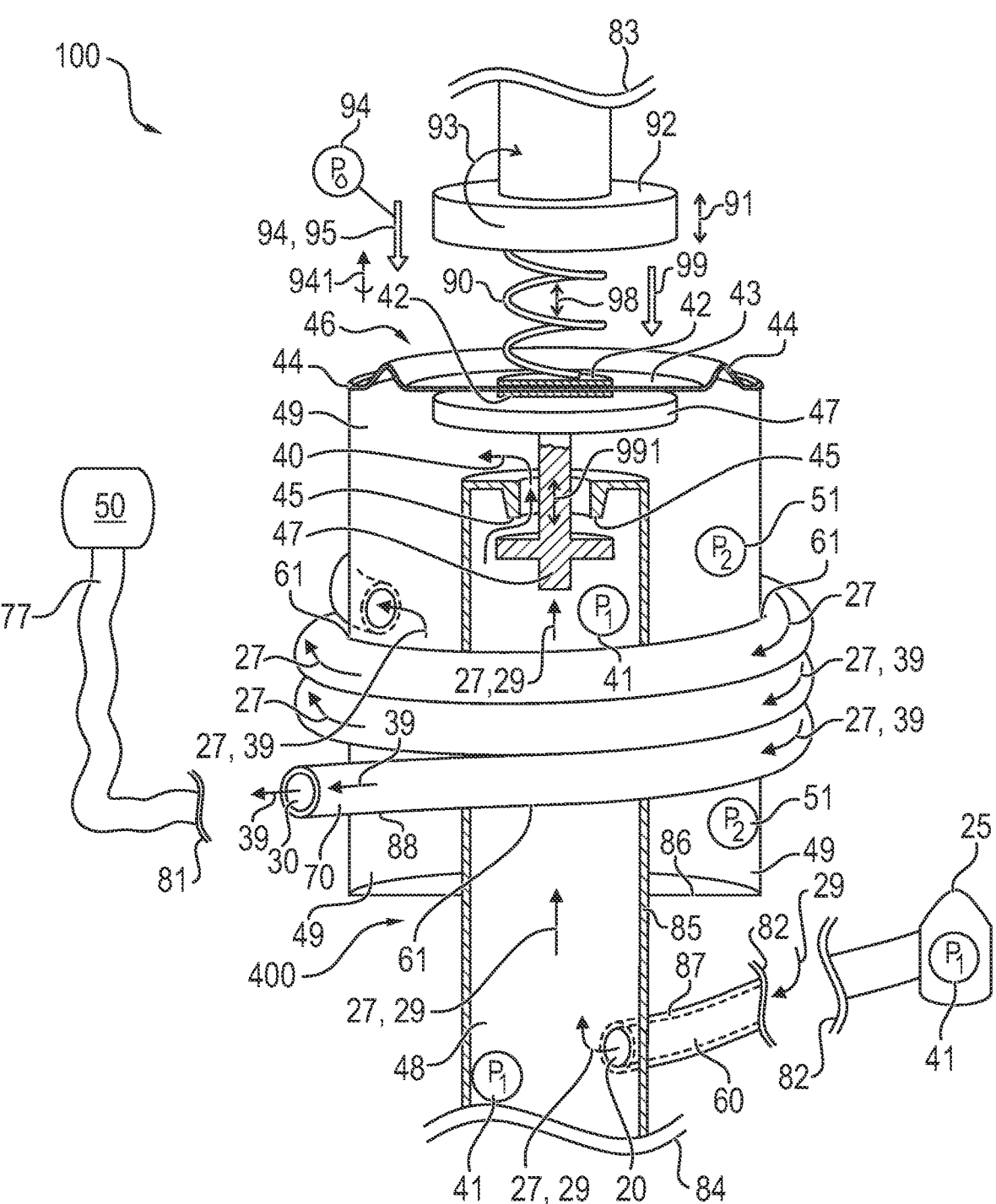
FIG. 1 is schematic view showing a device with an arrangement for pressure reduction.

Referring to the drawings, FIG. 1 schematically shows in cross-section a pressure reduction device 100 with an arrangement 400 for connection to a high-pressure source 25 and for connection to a regulator 50. The regulator 50 is connected via a hose line 77 to a second gas supply line 70 with a gas outlet 30. The high pressure source 25 is connected to the arrangement 400 via a gas inlet 20 and a first gas supply line 60. Via the gas inlet 20, gas quantities 27, 29 can flow from the high pressure source 25 via the first gas supply line 60 into an inner chamber 48 (high pressure chamber). The second gas supply conduit 70 includes a wall 88. The first gas supply conduit 60 has a wall 87. The inner chamber 48 (high pressure chamber) has a wall 85. The outer chamber 49 (medium pressure chamber) has a wall 86.

The gas volumes 27, 29, 40 flow from the inner chamber 48 via a valve arrangement 46 into an outer chamber 49 (medium pressure chamber). The valve arrangement 46 causes a reduction of the first pressure level P1 41 to a second pressure level P2 51. To effect the pressure reduction, the valve arrangement 46 has as elements a valve seat 45, a valve element 47, a flexibly configured diaphragm 43, a spring element 90 and connecting elements 42 provided for coupling the valve element 47 and the spring element 90 to the diaphragm 43.

The preload of the spring element 90 can be adjusted by means of an adjusting element 92. Such an adjustment element 92 can, for example, be configured in such a way that the preload can be adjusted over a mechanical adjustment path 91 by means of a rotary movement 93.

In addition to the spring element 90, which applies a spring force 99 to the diaphragm 43 with the spring movement 98, a further force 95 acts on the diaphragm 43—in an underwater application or diving application—due to a water pressure 94. For the diaphragm 43, a resulting adjustment travel 991 thus results summarily from a hydropneumatic adjustment travel 941 caused by the water pressure 94 and the mechanical adjustment travel 91.

The preload, the water pressure 94 and the spring force 98 are counteracted by the first pressure level P1 41. The pressure level P1 41 acts on the valve element 47. In the configuration as a pressure reducer, the valve element 47 usually has a spring assembly in the region (on a side) of the first pressure level—not shown in this FIG. 1 for reasons of clarity of the drawings which is dimensioned and configured together with the spring element 90 for setting the degree of pressure reduction from the first pressure level P1 41 to the second pressure level P2 51, i.e. the conversion from a high pressure level of 200 bar, for example, to a medium pressure level of 5 bar, for example.

In an application of the device 100 for a diving apparatus, the influence of the water pressure 94 on the position of the flexible diaphragm 43 results from the water pressure 94 depending on the diving depth in use. This allows a tracking of the adjustment of the pressure reduction at different diving depths. In a variant of an application on land, for example in the use of the device 100 for rescue forces of the fire department, the access of water to the device 100 can be omitted, also an adjustment of the mechanical adjustment travel 91 by means of the rotary movement 93 can be omitted if necessary and/or optional. Separation points 81, 82 indicate how the connections with the gas supply lines 60, 70 to the high-pressure gas source 25 and the demand valve 50, respectively, can be configured. Further separation points 83, 84 of this FIG. 1 indicate how the arrangement 400 can be embedded in the overall structure of the device 100.

In this FIG. 1, the second gas supply conduit 70 at least partially surrounds the arrangement 400 externally. In this FIG. 1 embodiment, the second gas supply conduit 70 wraps around the arrangement 400 in a spiral, annular, and/or helical manner with the inner and outer chambers 48, 49.

By means of configurations of the second gas supply line 70 in the form of such temperature exchange channels (heat transfer channels), a temperature equalization between walls 85, 86 of the inner and/or outer chamber 48, 49 and/or walls 87, 88 of the gas supply lines 60, 70 and thus also of the gas quantities 27 flowing within the inner and/or outer chamber 48, 49 and/or the gas supply lines 60, 70 as well as the elements 42, 43, 44, 45, 47 of the valve arrangement 46 is made possible. The temperature equalization is illustrated in FIG. 1 by contact points 61. This temperature compensation has the advantage that icing of the device 100, by the cooling accompanying the pressure reduction in/of gas quantities 40 at the valve arrangement 46, can be reduced or even largely prevented.

The arrangement 400 with the second gas supply conduit 70 can preferably be formed integrally with the walls 87, 88 of the inner or outer chamber 48, 49, the inner or outer chamber 48, 49 itself, and other components of the arrangement 400 or of the device 100. Such a one-piece embodiment, preferably made of a solid material, may advantageously be provided by a manufacturing or joining process based on a printing technology or 3D printing technology for forming a form-fitting and/or force-fitting as well as gastight connection of plastic materials and/or metallic materials. In an alternative embodiment, the second gas supply conduit 70 may be attached as a separate assembly or component with thermal contact 61 to the arrangement 400 with that of the inner or outer chamber 48, 49 or their walls 87, 88.

Figure 2:
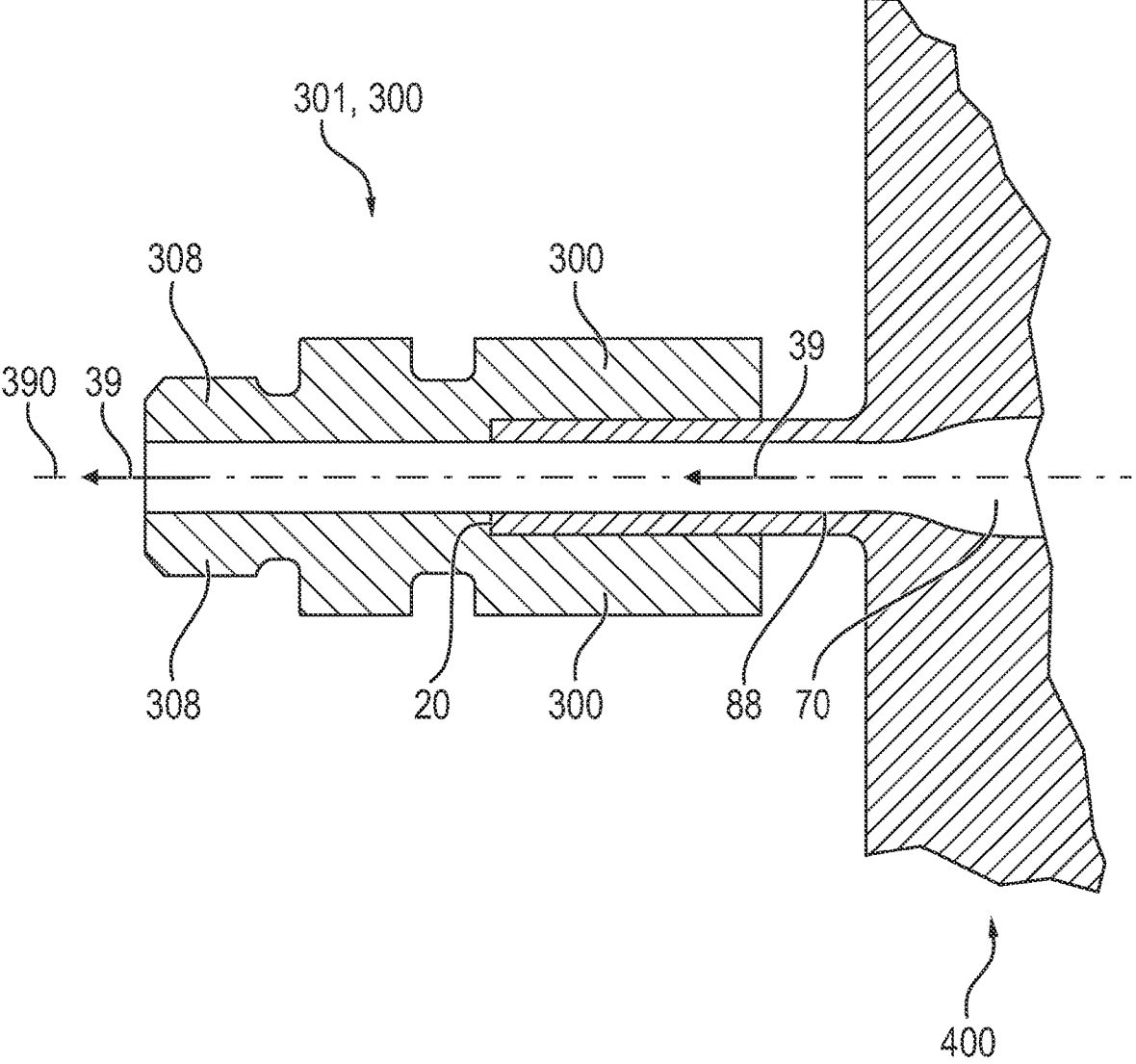
FIG. 2 is a sectional view showing the gas outlet according to FIG. 1 with a connecting element.

FIG. 2 shows the gas outlet 30 at the end of the second gas supply line 70 according to FIG. 1 in an assembly with a connecting element 300. The connecting element 300 is configured as a so-called cutting ring compression fitting. A central axis 390 is shown to illustrate the orientation of the joining of the second gas supply line 70 with the connecting element 300 in/at the arrangement 400.

Identical elements in FIG. 1 and FIG. 2 are designated by the same reference numerals in FIGS. 1, 2. The connecting element 300 receives the second gas supply line 70 with the gas outlet 30 on the inside. Cutting clamping elements, as graphically indicated in FIG. 3, establish, and ensure a non-positive and positive connection of the second gas supply line 70 with gas outlet 30 with the connecting element 300 at one end of the connecting element. In FIG. 2 as well as in FIG. 3, the connection element 300 has, by way of example, a plug element 308 at the other end, which is configured to be connected to a matching coupling element, for example to enable a hose line 77 (FIG. 1) to be connected to a regulator 50 (FIG. 1).

Similarly, the first gas conduit 60 (FIG. 1) can be fluidly connected to the gas inlet 20 (FIG. 1) by means of a connecting element to a high pressure source 25 (FIG. 1).

Figure 3:
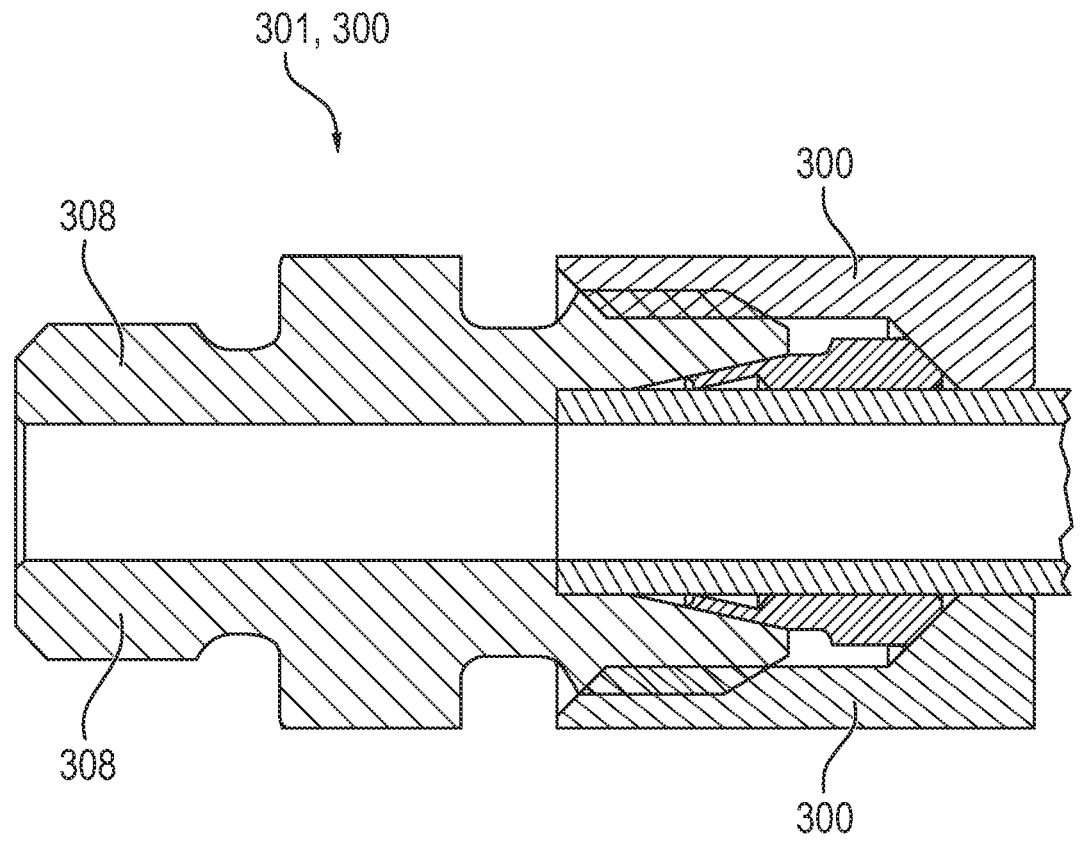
FIG. 3 is a sectional view and a perspective view showing the connecting element according to FIG. 2.
Figure 3:
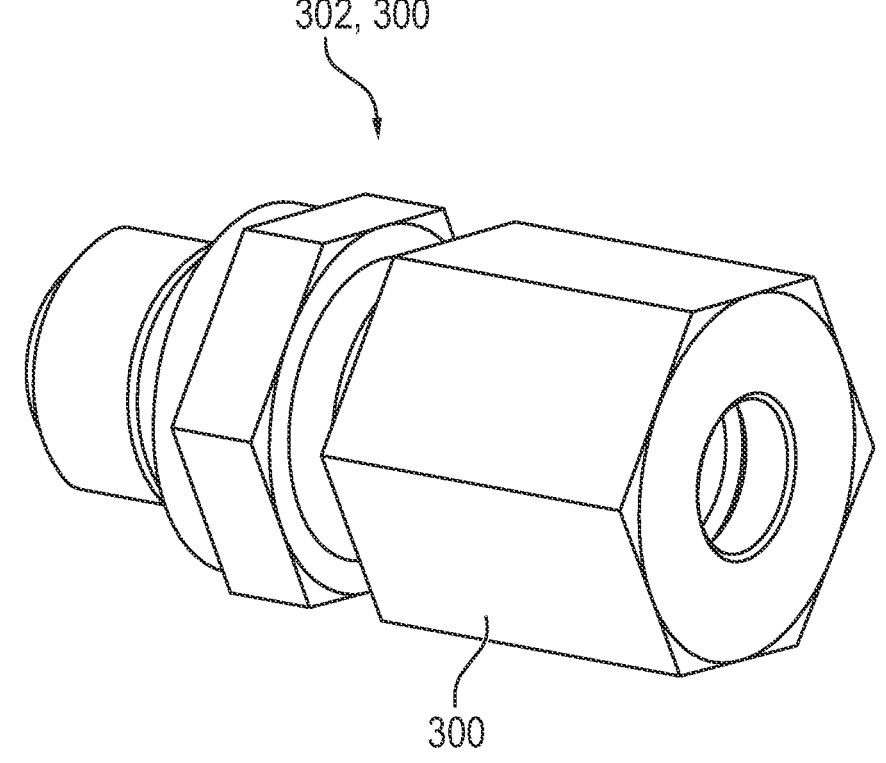

FIG. 3 shows the connecting element 300 in an exemplary embodiment of a cutting ring compression fitting according to FIG. 2 in a sectional view 301 and in a perspective view 302. Identical elements in FIGS. 2 and 3 are designated with the same reference numerals.

Figure 4:
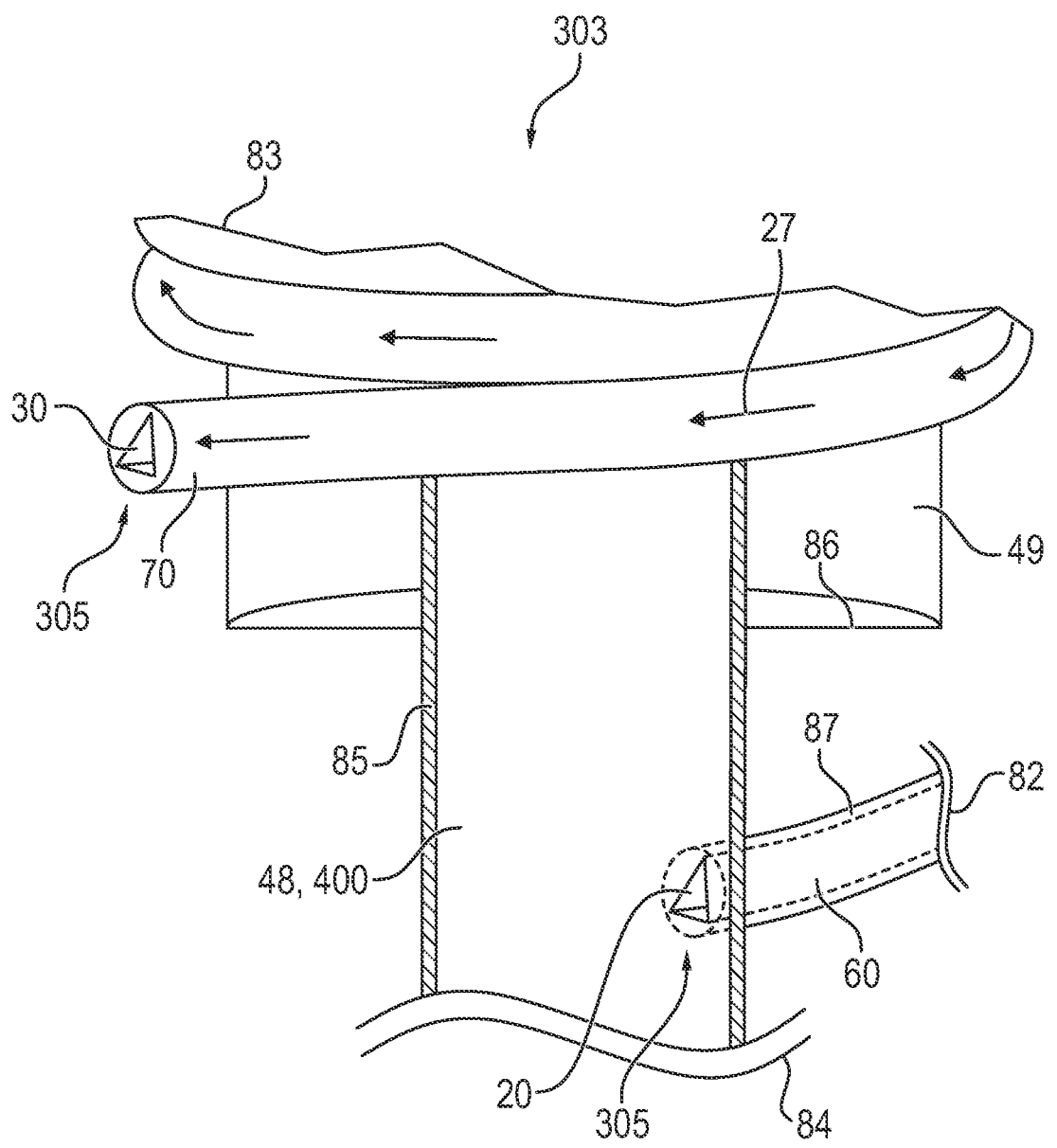
FIG. 4 is a partial sectional view showing a variant of the gas outlet and gas inlet according to FIG. 1.
Figure 5:
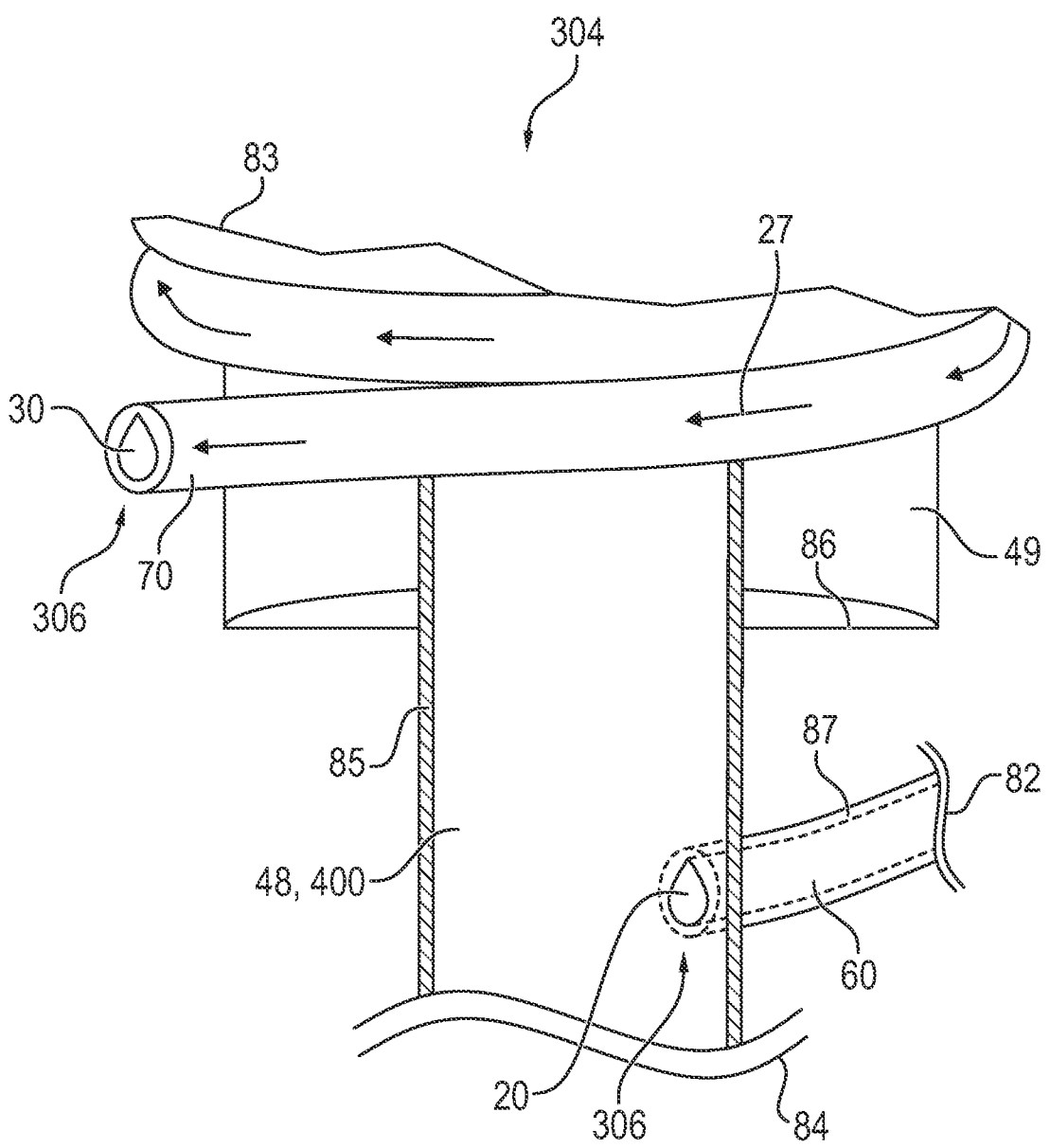
FIG. 5 is a partial sectional view showing another variant of gas outlet and gas inlet according to FIG. 1.

FIG. 4 shows in a detailed representation 303 a variant of gas outlet 30 and gas inlet 20 according to FIG. 1. Identical elements in FIGS. 1, 2, 3, 4 are designated with the same reference numerals in FIGS. 1, 2, 3, 4. FIG. 5 shows in a further detailed illustration 304 another variant of gas outlet and gas inlet according to FIG. 1. Identical elements in FIGS. 1, 2, 3, 4, 5 are designated with the same reference numerals in FIGS. 1, 2, 3, 4, 5. The gas inlet and the gas outlet 30 are shown in FIG. 1 on the outside and on the inside with a round shape without contours or shaping.

FIGS. 4 and 5 show variants of gas inlet 20 and gas outlet 30 with an outer circular shape for connecting connection elements that accommodate the outer circular shape of gas inlet and gas outlet 30 on the inside. For example, a connecting element 300 (FIG. 2), formed as a cutting ring clamping connection, can receive the outer circular shape of gas outlet 30 on the inside. Gas inlet 20 and gas outlet 30 can be formed with contours on the inside.

Such contours make it possible to avoid additional and possibly complex support structures, as may be required for some manufacturing or joining processes, in particular 3D printing technology processes. For example, 3D printing technologies such as Direct Metal Laser Sintering (DMLS) or Select Laser Melting (SLM) would normally require support structures, i.e. processes in which metal powder is welded in the powder bed by means of a laser.

FIG. 4 shows in detail 303 both the gas inlet 20 and the gas outlet 30 with internal triangular structures 305, which may preferably be in the form of an equilateral triangle.

FIG. 5 shows in detail 304 both the gas inlet 20 and the gas outlet 30 with drop-shaped structures 306 on the inside.

For example, the structures 305, 306 shown in FIGS. 5 and 6 allow for no support structures to be required inside gas inlet 20 or gas outlet 30 in an embodiment of the device having a pressure reduction arrangement formed in a selective laser sintering (SLS) or selective laser melting (SLM) manufacturing process.

While specific embodiments of the invention have been shown and described in detail to illustrate the application of the principles of the invention, it will be understood that the invention may be embodied otherwise without departing from such principles.

LIST OF REFERENCE NUMBERS

20 Gas inlet
25 High pressure gas source
27 Quantities of gas
29 Flow arrows from incoming gases
30 Gas output, medium pressure output
39 Flow arrows from outflowing gases
40 Flow arrows, flow at valve seat/valve element
41 First pressure level P1
42 Fasteners
43 Diaphragm, flexible diaphragm, elastic diaphragm
44 Diaphragm mounting
45 Valve seat
46 Valve assembly with 42, 43, 44, 45, 47,
47 Valve element

48 Inner chamber, high pressure chamber
49 Outer chamber, medium pressure chamber
50 Regulator
51 Second pressure level P2
60 First gas supply line
61 Contact points, thermal contact, thermal conductive contact
70 Second gas supply line
77 Hose line
81, 82 Separating points in gas supply lines 20, 30, 60, 70
83, 84 Disconnect points in arrangement 400
85, 86 Walls of inner/outer chambers 48, 49
87, 88 Walls of gas supply lines 60, 70
90 Spring element
91 Mechanical adjustment travel
92 Adjustment element, rotary handle
93 Setting movement, rotary movement
94 Water pressure
95 Other force
98 Spring movement, spring travel
99 Spring force
100 Device for pressure reduction
300 Connection element
301 Section display
302 Perspective view
303, 304 Detail representations
305 Triangular structure
306 Teardrop (drop) shaped structure
308 Center axis
400 Arrangement
941 Hydropneumatic adjustment travel
991 Resulting adjustment travel

What is claimed is:

1. A pressure reduction device for adjusting a gas pressure, the pressure reduction device comprising:

an arrangement for reducing a first pressure level to a second pressure level, the arrangement comprising: an inner chamber; and an outer chamber;

a first gas supply line providing fluidic communication from a high pressure gas source to a gas inlet of the inner chamber for supplying and delivering quantities of gas at the first pressure level from the high pressure gas source to the arrangement; and a second gas supply line providing fluidic communication from the outer chamber to a gas outlet for supplying and delivering quantities of gas at the level of the second pressure level to the gas outlet, wherein the second gas supply line at least partially externally surrounds at least one gas carrying section of the arrangement, and a thermally conductive contact is provided at least in part between the second gas supply line and the arrangement, such that a temperature balance is provided between quantities of gas within the at least one gas carrying section of the arrangement and quantities of gas within the second gas supply line and/or a temperature equalization is provided between the at least one gas carrying section of the arrangement and the second gas supply line.

2. A pressure reduction device of claim 1, wherein the apparatus is configured to reduce the first pressure level, which is above 10 MPa to the second pressure level, which is below 10 MPa and above 2 MPa.

3. A pressure reduction device according to claim 1, wherein the second gas supply line, starting with a first end has an annular configuration and/or a helical configuration at least partially on an outside around the at least one gas carrying section of the arrangement;

the second gas supply line opens with a second end into the gas outlet;

the second gas supply line surrounds further elements of the arrangement at least partially on the outside; and a thermally conductive contact is at least partially provided between the second gas supply line and the further elements of the arrangement, so that a temperature equalization between the further elements of the arrangement and quantities of gas within the second gas supply line and/or a temperature equalization between the further elements of the arrangement and the second gas supply line is provided.

4. A pressure reduction device according to claim 1, wherein the gas outlet of the arrangement is configured on the inside with a geometry which forms an inner contour with no step or no shoulder in a transition between the gas outlet and a connection element, so that a flow state without flow separation, and/or essentially without local turbulence and/or with a substantially laminar local flow is present at the transition of the gas outlet to a regulator for a supply of quantities of gas from the gas outlet by means of a connecting line to the regulator; and the inner contour is produced in a manufacturing or joining process which is based on a formation of a form-fitting and/or force-fitting as well as gas-tight connection of plastic materials and/or metallic materials using a printing technology or 3D printing technology.

5. A pressure reduction device according to claim 1, wherein the gas outlet of the arrangement is configured on an outside with a cylindrical or tubular outer contour; and the cylindrical outer contour is produced in a manufacturing or joining process which is based on a formation of a form-fitting and/or force-fitting as well as gas-tight connection of plastic materials and/or metallic materials using a printing technology or 3D printing technology.

6. A pressure reduction device according to claim 1, wherein at least one of:

the second gas supply line together with the arrangement is configured as a common component formed as an integral single piece component;

the second gas supply line together with the gas outlet is configured as a common component formed as an integral single piece component;

the gas outlet together with the arrangement and with the second gas supply line is configured as a common component formed as an integral single piece component;

the gas inlet together with the arrangement and with the second gas supply line is configured as a common component formed as an integral single piece component; and the gas inlet, the gas outlet and the second gas supply line together with the arrangement and with the second gas supply line is configured as a common component formed as an integral single piece component.

7. A pressure reduction device of claim 6, wherein:

the common component is produced in a manufacturing or joining process based on a printing technology or 3D printing technology; and materials comprised of plastic materials, plastic composites, metal materials, or metal composites are used in the manufacturing or joining process based on a printing technology or 3D printing technology.

8. A pressure reduction device of claim 6, wherein a valve assembly comprising a diaphragm, a diaphragm attachment, a valve element, a spring element, and a valve seat is produced in a manufacturing or joining process based on a printing technology or 3D printing technology as a common component formed as an integral single piece component.

9. A pressure reduction device of claim 6, wherein the common component is manufactured in one piece in a manufacturing or joining process based on a printing technology or 3D printing technology.

10. A pressure reduction device of claim 9, wherein the manufacturing or joining process based on 3D printing technology does not involve the use of support structures.

11. A pressure reduction device according to claim 1, wherein the gas outlet and/or the gas inlet is inserted, screwed or pressed as an insert into a matching seat arranged in the arrangement.

12. A pressure reduction device according to claim 1, wherein the gas inlet and/or the gas outlet and/or at least some parts of a valve assembly comprising a valve seat, valve element, a spring element, a diaphragm, and a diaphragm attachment is prepared or pre-machined in a manufacturing or joining process based on printing technology or 3D printing technology and is further processed by conventional mechanical machining.

13. A process of automated additive manufacturing of a pressure reduction device, the process comprising:
providing an arrangement comprising an inner chamber and an outer chamber;
providing a first gas supply line configured to provide fluidic communication from a high pressure gas source to a gas inlet of the inner chamber for supplying and delivering quantities of gas at the first pressure level from the high pressure gas source to the arrangement;
providing a second gas supply line configured to provide fluidic communication from the outer chamber to a gas outlet for supplying and delivering quantities of gas at the level of the second pressure level to the gas outlet,
wherein the steps of providing the arrangement and providing the second gas supply comprise arranging the second gas supply line on the arrangement having the inner chamber and the outer chamber by forming the second gas supply line with the arrangement as a common component formed as an integral single piece component such that the second gas supply line has an annular configuration and/or a helical configuration at least partially on an outside around at least one gas carrying section of the arrangement and a thermally conductive contact is at least partially provided between the at least one gas carrying section of the arrangement and the second gas supply line.

14. A process of automated additive manufacturing of a pressure reduction device according to claim 13, wherein the process further comprises forming the gas outlet with an internal contour to be disposed on the arrangement comprising the inner chamber and the outer chamber and forming the common component of the gas outlet with the arrangement such that there is no step and/or no shoulder in a transition between the gas outlet and a connector element.

15. A process according to claim 13, wherein a computer program provided on a non-transitory computer-readable medium or computer program product comprising program code on a non-transitory computer-readable medium is used to form the second gas supply line with the arrangement as a common component formed as an integral single piece component.

16. A computer program provided on a non-transitory computer-readable medium or computer program product comprising program code on a non-transitory computer-readable medium for carrying out a process for controlling a production facility, wherein the program code is executable on a computer, a processor or a programmable hardware component, the program code comprising instructions for controlling the production facility, which production facility comprises a 3D printing apparatus and/or drilling device, and/or turning device and/or milling device to form a pressure reduction device comprising an arrangement for reducing a first pressure level to a second pressure level, the arrangement comprising: an inner chamber; an outer chamber; and a first gas supply line providing fluidic communication from a high pressure gas source to a gas inlet of the inner chamber for supplying and delivering quantities of gas at the first pressure level from the high pressure gas source to the arrangement; and a second gas supply line providing fluidic communication from the outer chamber to a gas outlet for supplying and delivering quantities of gas at the level of the second pressure level to the gas outlet, wherein the 3D printing apparatus and/or the drilling device, and/or the turning device and/or the milling device forms the second gas supply line with the arrangement as a common component formed as an integral single piece component such that the second gas supply line has an annular configuration and/or a helical configuration at least partially on an outside around at least one gas carrying section of the arrangement and a thermally conductive contact is at least partially provided between the at least one gas carrying section of the arrangement and the second gas supply line.

17. A computer program provided on a non-transitory computer-readable medium or computer program product comprising program code on a non-transitory computer-readable medium according to claim 16, wherein data is provided with the program or with the code of the program or the code of the program accesses data on a shape and configuration of the pressure reduction device.

18. A computer program provided on a non-transitory computer-readable medium or computer program product comprising program code on a non-transitory computer-readable medium according to claim 17, wherein the data comprises CAD models, 3D models, 2D models, wireframe models or vector data from computer-aided engineering (CAE) programs suitable for configuration and construction.

19. A computer program provided on a non-transitory computer-readable medium or computer program product comprising program code on a non-transitory computer-readable medium according to claim 17, wherein the gas outlet is formed with an internal contour to be disposed on the arrangement comprising the inner chamber and the outer chamber and forming the common component of the gas outlet with the arrangement such that there is no step and/or no shoulder in a transition between the gas outlet and a connector element.

\* \* \* \* \*